UNITED STATES PATENT OFFICE.

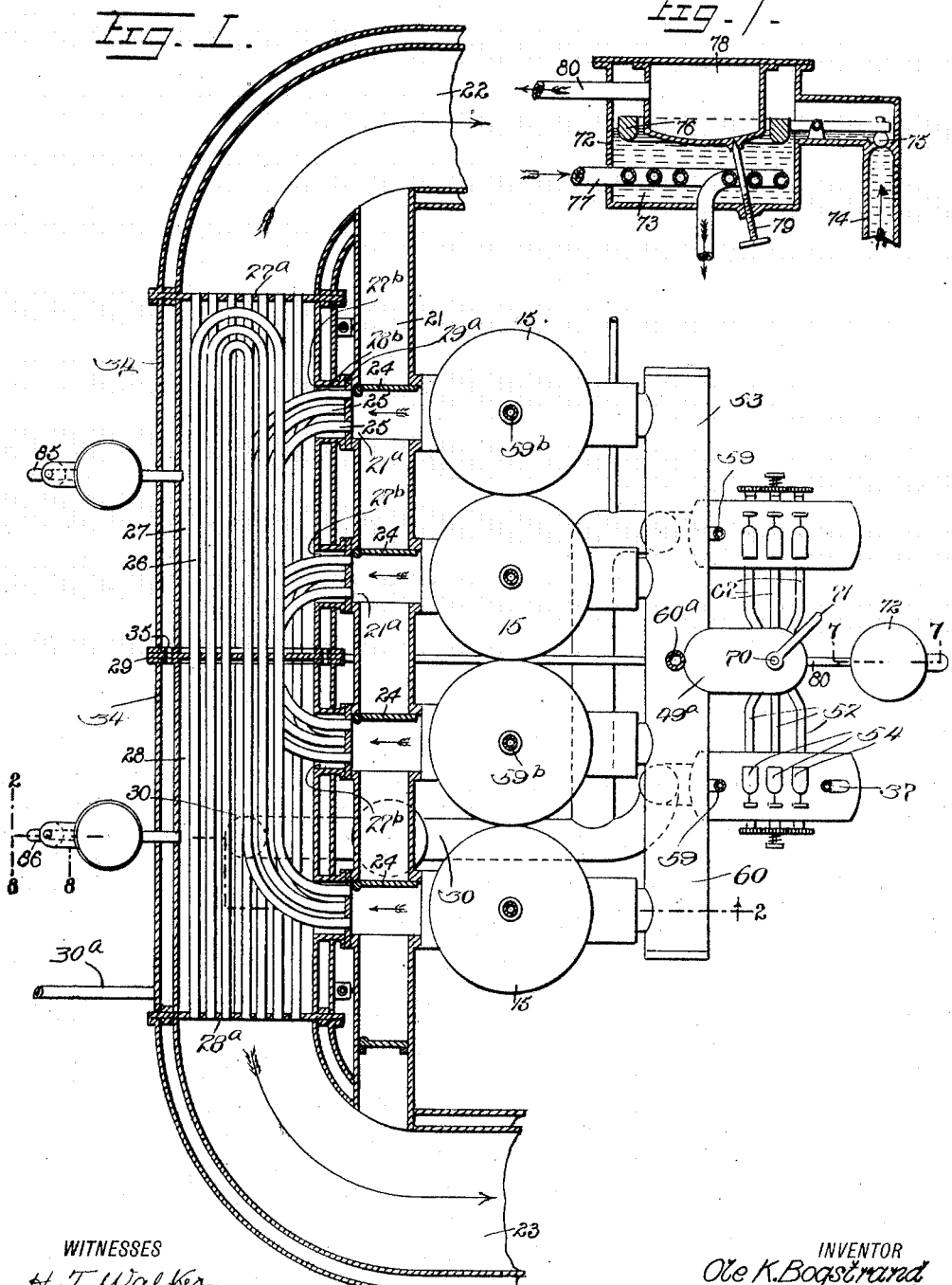

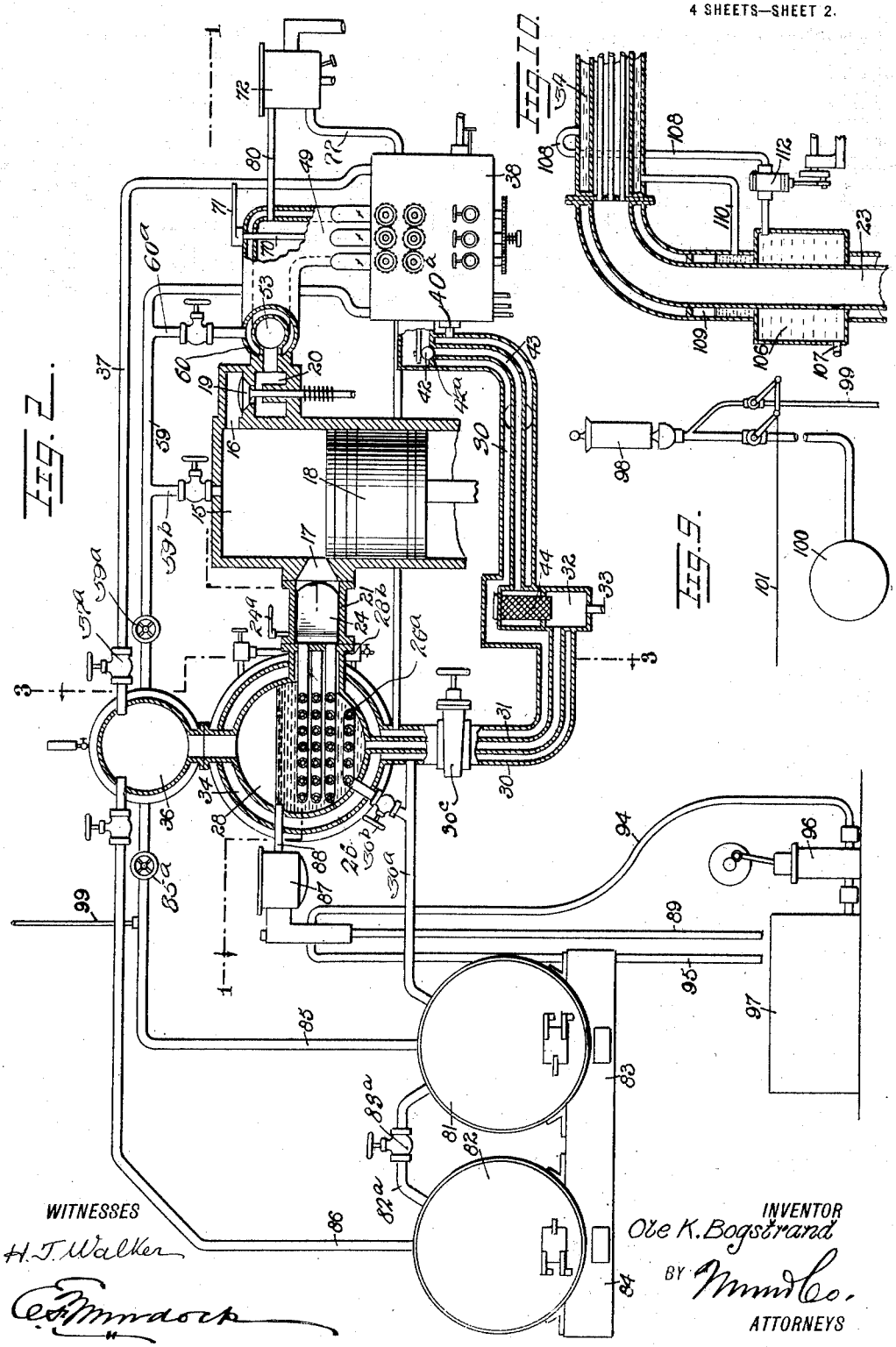

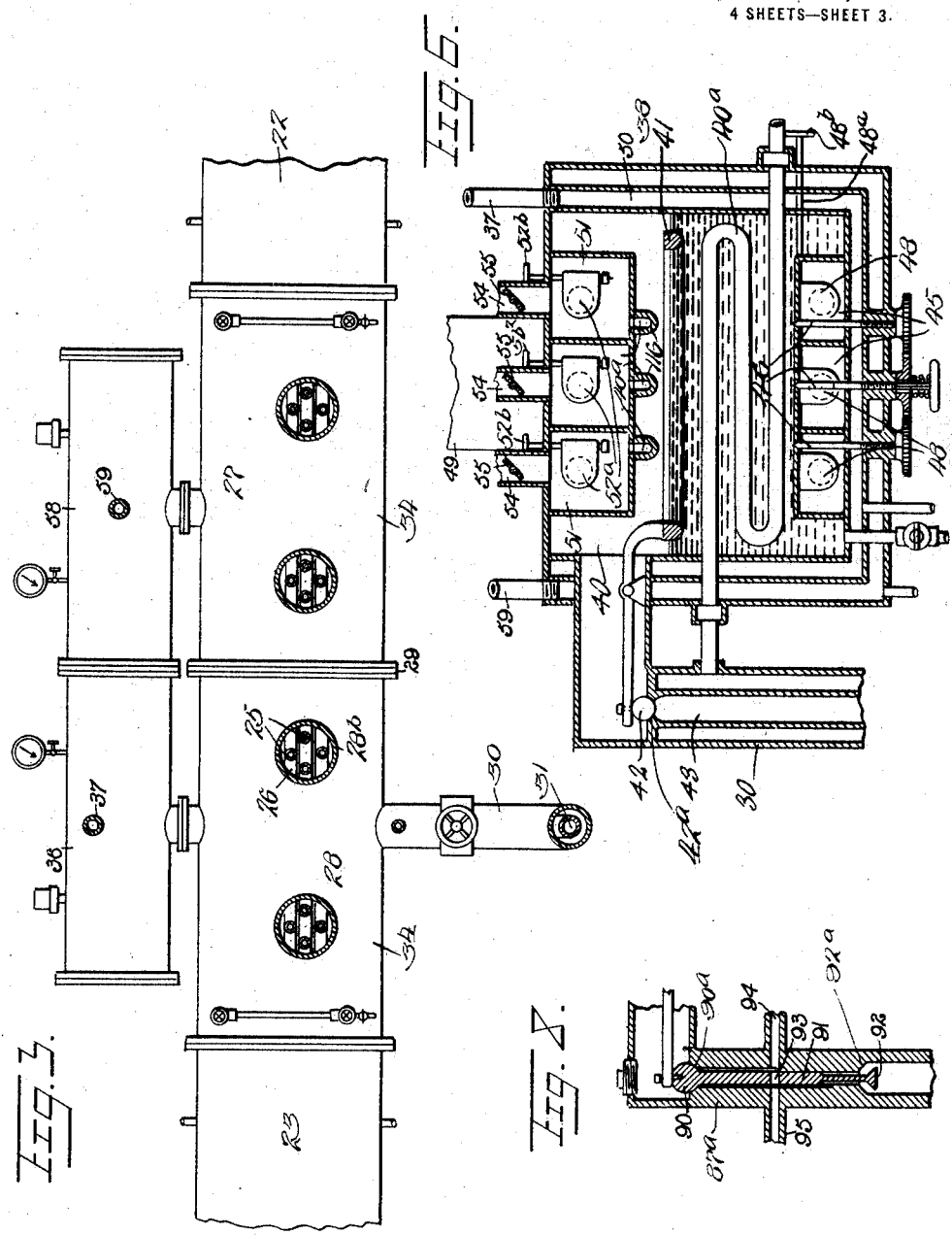

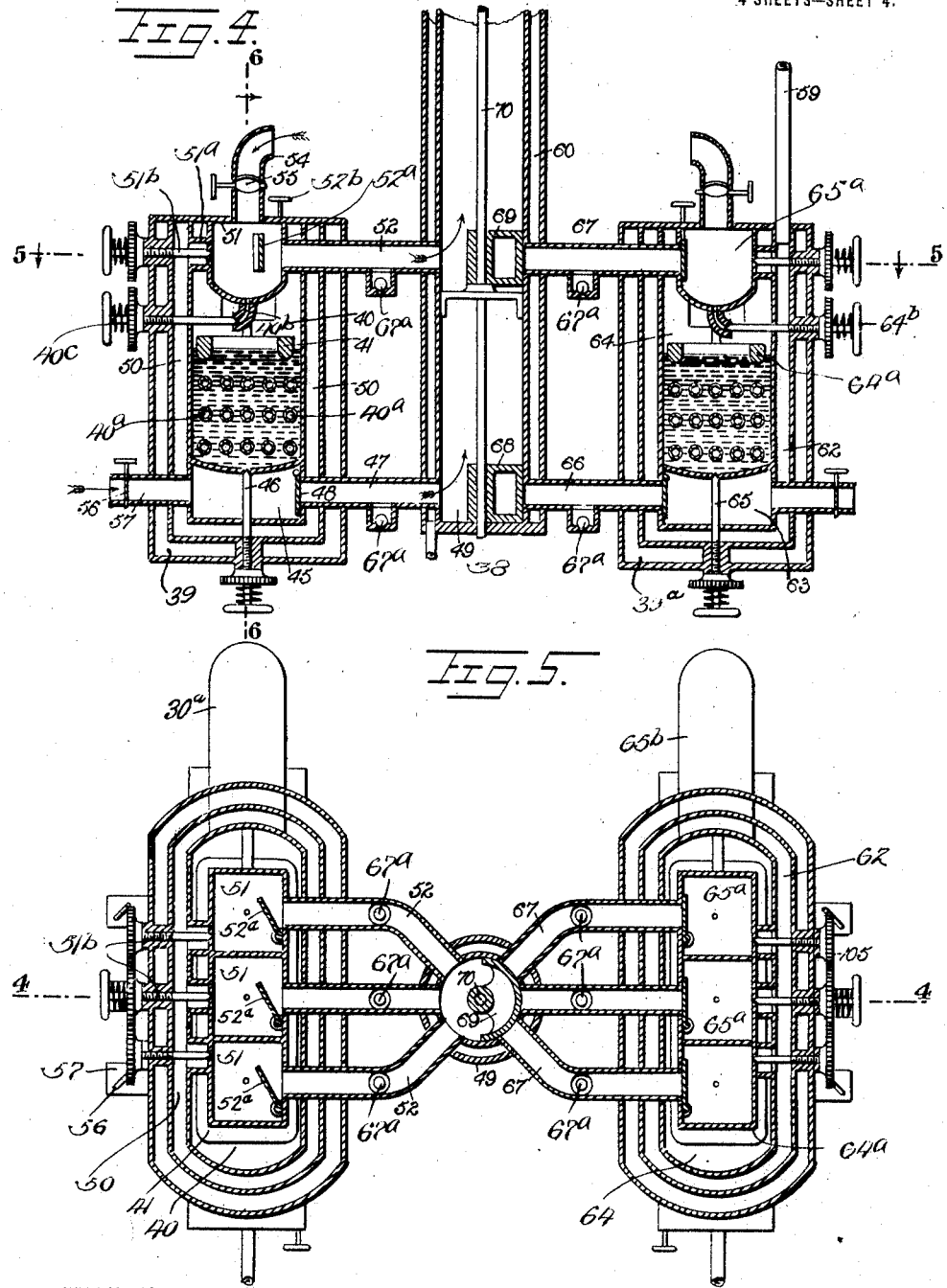

OLE K. BOGSTRAND, OF BROOKLYN, NEW YORK.

POWER PLANT.

1,388,694.   Specification of Letters Patent.   Patented Aug. 23, 1921.

Application filed May 12, 1917. Serial No. 168,118.

*To all whom it may concern:*

Be it known that I, OLE K. BOGSTRAND, a citizen of the United States, and a resident of the city of New York, borough of Brooklyn, in the county of Kings and State of New York, have invented a new and Improved Power Plant, of which the following is a full, clear, and exact description.

Among the principal objects which the present invention has in view are: to furnish a combustible fuel at reduced cost; to conserve the heat units employed in the production of said fuel; to vary the quality of fuel during the period of employment thereof; and to employ the surplus heat incident to the formation of said fuel for various purposes.

*Drawings.*

Figure 1 is a plan view of an engine constructed and arranged in accordance with the present invention, the fuel component reservoirs being shown in section;

Fig. 2 is a cross section of the same, said section being taken as on the line 2—2 in Fig. 1;

Fig. 3 is a longitudinal section, said section being taken as on the line 3—3 in Fig. 2;

Fig. 4 is a vertical longitudinal section of carbureters used in the present invention, the section being taken as on the line 4—4 in Fig. 5;

Fig. 5 is a horizontal section of said carbureters, the section being taken as on the line 5—5 in Fig. 4;

Fig. 6 is a vertical section taken as on the line 6—6 in Fig. 4;

Fig. 7 is a vertical section of a water vapor supply reservoir on an enlarged scale, the section being taken as on the line 7—7 in Fig. 1;

Fig. 8 is an enlarged section of an oil feed valve, the section being shown on an enlarged scale and taken as on the line 8—8 in Fig. 1;

Fig. 9 is a detail showing the arrangement of parts of the construction when employing the same for blowing an alarm whistle;

Fig. 10 is a modified form of the invention illustrating a sectional view through a preheater and a steam generator which may be employed in connection therewith.

Referring to the drawings by characters of reference which denote like parts throughout the several views thereof, 15 designates the engine cylinders, each provided with an intake port 16, an exhaust port 17 and a piston 18 which is adapted to uncover the exhaust port upon reaching the limit of its power stroke. Each cylinder is formed at one side thereof with a housing communicating with the intake port, said housing constituting a valve casing in which a puppet valve 19 is designed to operate by means of a suitable cam (not shown). The housing is provided with a horizontal wall having a valve seat against which the puppet valve 19 is adapted to seat, the lower compartment formed by the horizontal wall constituting a mixing chamber 20 in which the fuel is received prior to its introduction into the explosion chamber of the cylinders 15. The exhausted products of combustion are adapted to pass from the explosion chamber to an exhaust manifold 21 having communication with each exhaust port. As illustrated said manifold communicates at its opposite ends with the exhaust pipes 22 and 23. The exhaust manifold is provided with a plurality of passages 21$^a$ disposed directly opposite the exhaust ports 17 and in order to provide means for selectively permitting the escape of the exhausted products of combustion through said passages 21$^a$ or through the extremities of the manifold which communicate with the exhaust pipes 22 and 23, use is made of the gates 24, pivoted within said manifold adjacent the passages 21$^a$, said gates being provided with operating handles 24$^a$ disposed exteriorly of the manifold.

A casing including cylindrical sections 27 and 28 disposed in the alinement and secured to each other is arranged at one side of the manifold and parallel therewith. A common head 29 constituting a partition for separating the cylindrical sections is provided and the open ends of the sections 27 and 28 are closed by the heads 27$^a$ and 28$^a$. The exhaust pipes 22 and 23 are respectively secured to the heads 27$^a$ and 28$^a$ as clearly illustrated in Fig. 1 of the drawings. The sections 27 and 28 are provided with openings 27$^b$ disposed in alinement with the passages 21$^a$ of the manifold and connected therewith for communication by the unions 28$^b$, heads 29$^c$ being secured between the unions and the manifold. A plurality of tubes bent upon themselves to provide heating coils 26 are provided, and said coils are disposed partially within each of the cylinder sections 27 and 28, the opposite terminals of the tubes 25 respectively passing through the heads 29ª and 28ª or 29ª and 27ª in order to establish communication between the passages 21ª and the exhaust pipes 22 and 23 respectively. By this arrangement it will be seen that upon swinging the gates 24 to the position illustrated in Fig. 1, the exhausted products of combustion will be directed through the tubes 25 constituting the coils 26 to the exhaust pipes 22 and 23 in order to heat the interior of the cylinder sections 27 and 28 for a purpose to be hereafter set forth. It will be further noted that upon swinging the gates 24 to a position to close the passages 21ª, the exhausted products of combustion will pass directly through the manifold to the exhaust pipes 22 and 23.

The cylindrical sections 27 and 28 are preferably provided with steam jackets 34, communication between said jackets being established by means of openings 35 formed in the head 29. A pipe 31 communicates at one extremity with the interior of the cylindrical section 28 at the lower end thereof, the opposite extremity being designed to communicate with a settling chamber 32 which receives oil from the pipe 31. The settling chamber 32 is provided with a transverse dividing wall and a strainer 44 of reticulated material is passed through an opening in the dividing wall in order to strain the oil supplied thereto to remove foreign matter therefrom which settles to the bottom of the chamber 32 and is drained therefrom by means of the drain pipe 33. A branch pipe 43 communicates with the upper portion of the settling chamber above the transverse dividing wall to receive the strained oil which travels therethrough to the carbureter. A steam jacket 30 surrounds the pipes 31 and 43 and said jacket is in direct communication with the steam jacket 34, whereby the fuel in the pipes 31 and 43 will be maintained at substantially the same temperature throughout its travel from the drum 28 to the carbureter. A valve 30ᶜ functions to establish or cut off the supply of steam to the jacket 30. A steam pipe 30ª leading from a source of steam supply communicates with the steam jacket 30 and a steam heating coil 26ª, arranged within the lower portion of the cylindrical sections 27 and 28. A valve 30ᵇ is provided for cutting off the supply of steam to the coil 26ª at the will of the operator. The steam pipe 30ª receives the steam supply from the boiler 81 in which the steam is generated by the fire in the fire box 83 arranged thereunder. A second boiler 82 designed to contain oil is provided and heated by a fire box 84 to generate an oil vapor which is adapted to be conducted therefrom to the drum 36 by means of a pipe 86. The purpose of the oil vapor generating apparatus is to provide an initial supply of oil vapor to start the engine. The tanks 81 and 82 may be connected by a pipe 82ª, the valve 83ª controlling communication therebetween. This connection permits steam to enter the tank 82 for mixing with the oil vapors and also produces pressure on the oil for feeding the same. The cylindrical section 27 is provided for the purpose of generating steam by the passage of the exhausted products of combustion through the heating coil 26 after the engine has been initially started. The water supply to the interior of the cylindrical section 27 is furnished by a supply tank and the float valve controlling mechanism, similar to that utilized to supply the oil to the cylindrical section 28 hereafter described and a detailed description and showing of the same has therefore been omitted as the construction and operation is the same.

A superposed drum 36 communicates with the interior of the cylindrical section 28 at the upper portion of the latter and the said drum is designed to receive oil vapor which is formed above the oil level when the exhausted products of combustion are introduced to the tubes 26. A pipe 37 communicates with the drum 36 and leads therefrom through a valve 37ª to a carbureter which will be hereafter described.

A superposed drum 58 communicates with the interior of the cylindrical section 27 at the upper portion of the latter and said drum is designed to receive steam generated above the water level in the cylindrical section 27 when the exhausted products of combustion are introduced through the tubes 26 for heating the same. A pipe 59 communicates with the drum 58 and leads therefrom to the carbureter to be hereafter described. A second pipe 85 communicating with the interior of the drum 58, leads to and communicates with the boiler 81 in which steam is initially generated upon starting the engine. Valves 59ª and 85ª are arranged in the pipes 59 and 85 respectively in order to cut off communication when found desirable. If desired steam may be admitted directly to the cylinders for starting the engine, branch pipes 59ᵇ being provided for the purpose and connected respectively to the pipe 59 and the cylinders.

Use is made of a carbureter 38 which is connected to the intake manifold 53 by an angular neck 49, the said manifold and angular neck being provided with a steam jacket 60 which receives its supply of steam through the branch pipe 60ª communicating respectively at its opposite ends with the pipe 59 and the interior of said steam jacket. The carbureter 38 includes two chambers 40 and 64, the former constituting an oil chamber and the latter a gasolene chamber which are disposed respectively at opposite sides of the angular neck 49. The oil is received from the cylindrical section 28 through the pipes 31 and 43 and the said supply is controlled by float valve mechanism which includes a float 41 and valve 42 controlled thereby which is designed to co-act with the valve seat 42ª arranged at the terminal of the pipe 43. From the chamber 40 the oil passes to the lower compartments 45 disposed below the chamber 40, the flow of oil thereto being controlled by needle valves 46. Ducts 47 establish communication between compartments 45 and the angular neck 49. Gates 48 are provided at the points of communication of the ducts 47 with the compartments 45, said gates being mounted on a common transverse rod 48ª which is provided with an outwardly projecting extremity having a manipulating handle 48ᴮ for controlling the passage of the oil thereto. Outside air is mixed with the oil in the compartments 45 by the admission of air thereto through the valves 56 arranged in the outer terminal of the intake pipes 57. An oil vapor chamber 50 is provided and preferably surrounds the oil chamber 40 and its lower compartments 45, the oil vapor being supplied thereto by the pipe 37 which establishes communication between said chamber 50 and the drum 36. Disposed within the upper portion of the oil chamber 40 are a plurality of oil vapor receiving chambers 51, each of which communicates with the oil vapor chamber 50 through a medium of pipe sections 51ª, said communication being controlled by the needle valves 51ᵇ. Each of the receiving chambers 51 is provided with means to permit of the admission of outside air, said means being in the nature of pipes 54 controlled by the butterfly valves 55. A pipe 52 establishes communication between the receiving chambers 51 and the angular neck 49 of the manifold 53. Gates 52ª are arranged within the receiving chambers 51 at the juncture of the pipe 52 therewith and the same are provided with handles 52ᵇ disposed outside of the carbureter for permitting the manipulation of said gates in order to control the supply of vapor to the manifold. In order to provide means for supplying an additional quantity of oil vapor to the receiving chambers 51, a pipe 40ª is arranged in the form of a coil within the oil chamber 40 and the said pipe communicates with the steam jacket 30 which surrounds the pipes 31 and 43. The vapor formed in the oil chamber 40 is admitted to the receiving chambers 51 through the nozzles 40ᵇ, the same being controlled by needle valves 40ᶜ each of which is provided with a manipulating head disposed at the exterior of the carbureter. The gasolene chamber 64 receives its supply of gasolene from a supply pipe 65ᵇ which communicates with said chamber and with a suitable gasolene supply (not shown). The construction and operation of the gasolene carbureter section is identical with the oil carbureter section, the supply being regulated by a float valve mechanism which includes a float 64ª and a valve (not shown) identical to the oil controlling valve 42. A steam chamber 62 is provided and surrounds the chamber 64, the same being equivalent to the oil vapor chamber 50 both in its construction and arrangement. The chambers 50 and 62 of the carbureter are respectively housed by the steam jackets 39 and 39ª to which steam is supplied by the pipes 59 for the purpose of maintaining the carbureter chambers at an even temperature. Steam is supplied thereto by the pipe 59 which leads from and communicates with the steam drum 58. Steam receiving chambers 65ª are provided in the upper portion of the gasolene chamber 64 and identical to the vapor receiving chambers 51. The chambers 65ª communicate with the angular neck 49 of the manifold through the medium of pipes 67 and said chambers are provided with means for admitting air thereto identical with the air admission means for the receiving chambers 51. Means for heating the gasolene in the chamber 64, identical with the oil heating means in the chamber 40 is provided and needle valves 64ᵇ are provided for establishing and regulating entrance of the gasolene vapors to the receiving chambers 65ª. Needle valves 65 serve to establish and regulate communication between the gasolene chamber 64 and the lower compartments 63. Ducts 66 establish communication between the compartments 63 and the angular neck 49 of the intake manifold. The pipes 52 and 67 and the ducts 47 and 66 are each provided with additional air intake valves in the form of gravity ball valves 67ª.

In order to provide means for controlling the admission of the fuel to the intake manifold, the angular neck is provided with rotary valves 68 and 69, said valves being mounted upon a stem 70 having an exteriorly arranged operating handle 71. The construction of the valves permits of their adjustment to admit fuel from either the oil carbureter section or the gasolene carbureter section or a mixture of both.

In order to provide means for introducing live steam directly to the intake manifold, use is made of a steam reservoir 72 which is provided with a steam receiving chamber 78 disposed in the upper portion of a water receiving tank 73. A heating coil formed by the steam supply pipe 77 is arranged in the water receiving tank 73. Said pipe 77 communicating at its opposite end with the steam chamber 62 of the carbureter from which it derives its supply of steam. After forming the coil the opposite terminal of the pipe is adapted to return to the steam chamber 62. A pipe 80 leads from the steam receiving chamber 78 to the angular neck 49 for injecting the live steam at this point, to be conveyed to the intake manifold. A float controlled valve 75 regulates the intake of water to the water tank 73, said water being supplied by a pipe 74 communicating at its opposite end with any suitable water supply (not shown). The float 76 for controlling the valve 75 is disposed within the water tank 73 and a needle valve 79 establishes communication between the water tank 73 and the steam receiving tank 78.

An oil supply used as a fuel in connection with the engine is contained in a tank 97 and a pump 96 communicates with the oil supply. A pipe 94 communicates with the pump and is adapted to convey the oil forced therethrough to a float chamber 87 in which is arranged a float valve for controlling the supply of oil to the interior of the cylinder section 28, a branch pipe 88 serving to establish communication between the float chamber and the interior of the cylinder section 28. Any standard form of float valve mechanism may be employed but the particular form illustrated in Fig. 8 is preferred and the same includes the cylindrical extension 87$^a$ depending from the float valve chamber. The cylindrical extension 87$^a$ is provided with a vertical bore in which is adapted to operate a valve 91 provided with a transverse valve opening 93 and having at its upper end a spherical valve head 90 adapted to engage the valve seat 90$^a$ provided at the upper extremity of the vertical bore. The lower end of said valve 91 is provided with a conical valve 92 adapted to coact with the conical seat 92$^a$. The cylindrical extension 87$^a$ is provided with transverse alined openings which communicate respectively with the pipe 94 and a return pipe 95. The upper extremity of the valve 91 is connected by any suitable means to a pivoted arm which is connected at its opposite end in the usual manner to the float. In operation of the valve, when the supply of oil falls below the level of the branch pipe 88, the float will descend therewith and cause the arm connected with the valve 91 to raise the same, lifting said valve and disengaging the spherical valve head 90 from its seat 90$^a$; at the same time seating the conical valve 92 on its seat; this operation will also move the valve opening 93 out of alinement with the transverse passages and permit a portion of the oil to flow through the vertical bore into the float chamber from whence it will be conveyed through the branch pipe 88 to the interior of the cylindrical section 28 until the supply again reaches a level in line with said branch pipe 88, at which time the float will again have raised under the influence of the oil to the proper level to seat the spherical valve head 90 and aline the valve opening 93 with the transverse passages, at the same time unseating the conical valve 92 from its seat 92$^a$ to permit excess oil in the vertical bore to be drained therefrom and returned through the pipe 89 to the tank 97. The pump 96 is designed to continuously operate to normally force the oil through the valve opening 93 to the pipe 95 through which it is returned to the tank 97.

An auxiliary steam supply may also be injected into the intake manifold, and the same is generated in a chamber 109 which surrounds the exhaust pipe 23 as illustrated in the modified form shown in Fig. 10 of the drawings. The steam is supplied to said chamber 109 by a pipe 110 which communicates therewith and also with the steam jacket 34. The steam which is supplied from the jacket 34 is superheated by the products of combustion which pass through the exhaust pipe 23. To assist in developing steam to supply the steam jacket, water is supplied through a pipe 107 to a reservoir jacket 106 surrounding the exhaust pipe 23 as illustrated in Fig. 10 and the steam generated in said reservoir jacket is forced through the pipe 108 to the steam jacket 34 by means of a pump 112.

In Fig. 9 of the drawings a whistle is illustrated at 98 which may be employed in connection with the engine. The steam is supplied thereto through a pipe 99 or if desired use may be made of compressed air contained in a tank 100 for the purpose. An operating cable 101 leading to the bridge of a steamer or any other desired point where the navigator may be stationed is provided for this purpose.

Claims:

1. In a power plant, the combination with an internal combustion engine having a plurality of cylinders and an exhaust manifold, of a pair of drums having heating pipes communicating with said manifold, means for passing any desired portion or all of the products of combustion either through said manifold or through the heating pipes, and means for supplying water to one of said drums and oil to the other as and for the purpose specified.

2. In a power plant, the combination with an internal combustion engine having a plurality of cylinders and exhaust manifold, of a pair of drums having heating pipes communicating with said manifold, means for passing any desired portion or all of the products of combustion either through said manifold or through the heating pipes, means for supplying water to one of said drums and oil to the other, a carbureter having a fuel chamber and a steam jacket and means for respectively conveying vapors from the oil drum to the fuel chamber and from the steam drum to the steam jacket.

3. In a power plant, the combination with an internal combustion engine having a plurality of cylinders and an exhaust manifold, of a pair of drums, heating pipes arranged therein and having the opposite ends thereof communicating respectively with the manifold and atmosphere, independent means for controlling the flow of the products of combustion through each of said heating pipes, means for supplying heated water to one of said drums, means for supplying heated oil to the other drum, a carbureter including a fuel chamber and a steam jacket inclosing said fuel chamber, and means for respectively conveying the oil to said fuel chamber and the steam to said steam jacket.

4. A power plant comprising an internal combustion engine having a plurality of cylinders, an exhaust manifold, a pair of drums having heating pipes communicating with said manifold, means for controlling the flow of products of combustion through said heating pipes, means for supplying water to one of said drums, means for supplying oil to the other of said drums, and means for initially heating the water and the oil in said drums prior to the heating of the oil and water in said drums by the products of combustion, said last named means including auxiliary steam pipes disposed within said drums, and means for controlling the flow of steam through said auxiliary steam pipes.

5. In a power plant, the combination with an internal combustion engine, of means for utilizing any desired proportionate amount of the products of combustion for heating the fuel supply, a carbureter including an oil heating and vaporizing chamber, a gasolene heating and vaporizing chamber, and steam jackets inclosing said chambers, means for conveying the fuel supply to the respective fuel chambers, means for supplying steam to the steam jackets, and a common means for conveying the oil and gasolene vapors generated in said chambers to the intake port of the engine.

6. In a power plant, the combination with an internal combustion engine having a plurality of cylinders and an exhaust manifold, of means for utilizing any desired proportionate amount of the products of combustion for heating the fuel supply, said means comprising exhaust pipes communicating respectively with the opposite ends of the manifold, a heating chamber, heating coils arranged therein and having the opposite ends thereof respectively communicating with the manifold and the exhaust pipes, and means independently adjustable to selectively direct the products of combustion through the coils to the exhaust pipes or directly thereto from the manifold.

7. In a power plant, the combination with an internal combustion engine having a plurality of cylinders each provided with an exhaust and intake port of a fuel heating chamber, a reservoir communicating therewith and adapted to receive fuel vapor generated therein, a water heating chamber, a steam reservoir communicating therewith for the reception of steam generated therein, a fuel receiving chamber communicating with the fuel heating chamber, a carbureter having a fuel vapor jacket surrounding the same and communicating with the fuel vapor reservoir, and a steam jacket surrounding the fuel vapor jacket and communicating with the steam reservoir, an exhaust manifold communicating with the vapor reservoirs, and exhaust pipes communicating respectively with the opposite ends of the manifold, heating coils disposed partially within the fuel and water heating chambers and communicating at their opposite ends respectively with the manifold and the exhaust pipes, and means in the manifold adjustable to selectively direct the products of combustion indirectly through the coils or directly thereto from the manifold.

OLE K. BOGSTRAND.